United States Patent
Mertens et al.

(10) Patent No.: US 6,325,911 B1
(45) Date of Patent: Dec. 4, 2001

(54) METHOD FOR MAKING COMPOSITES

(75) Inventors: Marc Mertens, Spa; Lucien Martinot, Olne; Robert Jerome, Sart-Jalhay, all of (BE)

(73) Assignee: Cipari, SA, Luxumbourg (BE)

( * ) Notice: Subject to any disclaimer, the term of this patent is extended or adjusted under 35 U.S.C. 154(b) by 0 days.

(21) Appl. No.: 09/462,297

(22) PCT Filed: Jul. 10, 1998

(86) PCT No.: PCT/BE98/00111

§ 371 Date: Apr. 3, 2000

§ 102(e) Date: Apr. 3, 2000

(87) PCT Pub. No.: WO99/02614

PCT Pub. Date: Jan. 21, 1999

(30) Foreign Application Priority Data

Jul. 11, 1997 (BE) .................................................. 09700608

(51) Int. Cl.[7] .............................. C25D 5/54; C25D 11/00
(52) U.S. Cl. ........................................... 205/159; 205/317
(58) Field of Search ..................................... 205/159, 317

(56) References Cited

U.S. PATENT DOCUMENTS 4,130,465  12/1978  Arai et al. .............................. 204/27
5,232,560  * 8/1993  Bell et al. .............................. 204/72
5,567,297  * 10/1996  Mertens et al. ........................ 205/334

FOREIGN PATENT DOCUMENTS

| 0 106 352 A1 | 4/1984 | (EP) . |
| 0 665 275 A1 | 8/1995 | (EP) . |
| 2 672 307 A1 | 8/1992 | (FR) . |

* cited by examiner

*Primary Examiner*—Edna Wong
(74) *Attorney, Agent, or Firm*—Laff, Whitesel & Saret, Ltd.; J. Warren Whitesel

(57) ABSTRACT

A method for making composites uses electrochemical polymer or copolymer coating of a carbon-based support by using a reaction system including (a) at least a monomer capable of forming a polymer on said support, (b) an aprotic solvent and (c) an electrolyte providing the resulting organic medium with an electrical conductivity for conducting therein electrolysis. The carbon support permanently forms the cathode, by applying either a potential or an electric current bringing the reaction system into the passivation zone corresponding to the first inhibition peak. The method forms a polymer grafted on the support.

17 Claims, 4 Drawing Sheets

Spectre XPS du PAE greffé sur Carbone vitreux.
Zone d'énergie du C1s

METHOD FOR MAKING COMPOSITES

The present invention relates to a process for manufacturing composites by electrochemically coating a carbon-based substrate with a polymer.

The field of composites has become particularly widespread, given the range of their applications in sectors of activity as different as the aerospace industry, the automobile industry (means of transportation in general), the sports industry, etc.

The use of carbon fibres in such materials is not only due to their low density but their high mechanical properties. However, the use of carbon fibres not pretreated on their surface results in composites with a low interlaminar shear strength. This has been attributed to poor adhesion—a weak bond between the fibres and the matrix. In order to improve this interfacial bond, the surface of these carbon fibres is generally subjected to an oxidizing or non-oxidizing treatment.

Such processes for the manufacture of carbon/polymer-based composites has formed the subject of many articles in the literature, as indicated below:

1) R. Subramanian and J. Jakubowski (Polymer Engineering, 1978, Vol. 18, No. 7, 590–600) claim the electrochemical grafting of various polymers such as methyl acrylates and styrene, but the grafting takes place, according to a mechanism which remains unknown, starting from surface impurities on the carbon. The potential required for this type of grafting is not specified.

2) Another method of indirectly initiating the polymerization is known: electrochemically formed species and radicals (anions and cations) are capable of causing polymerization reactions; J. Iroh, J. Bell and D. Scola (Journal of Applied Polymer Science, 1993, Vol. 49, 583–592) use the appearance of H radicals to electropolymerize N,N-dimethylacrylamide in aqueous $H_2SO_4$ solutions. The choice of potential is not a key factor. In this type of polymerization, grafting of the polymer onto the carbon has never been able to be proved: there is precipitation on the carbon electrode and the carbon/polymer adhesion is based on a simple physical phenomenon.

3) J. Pinson, J. M. Saveant at H. Rachid (French Patent 91/01172) form functional aryl radicals on the surface of the carbon by the electrochemical reduction of diazonium salts: an aromatic group thus modifies the carbon surface to which it is fixed. According to this process, other modifications of the composite thus formed ought also to be possible. In this process, the potential conditions are fixed by the fact that the reduction potential of the diazonium salt is less cathodic than the reduction potential of the radical initially produced.

4) S. Shkolnik and C. Barash (Polymer, 1993, Vol. 34, No. 1, 2921–2928) describe the electrocopolymerization of glycidyl methacrylate (GMA) and methyl methacrylate. The oxirane ring of the GMA should be involved in the formation of a bond between the polymerized layer and the graphite surface. This technique implies no control of the potential.

5) We should point out that, in 1983, N. Tsubokawa, A. Yamada and Y. Stona (Polymer Bulletin, 1983, Vol. 10, 63–69) demonstrated the grafting of polyesters, resulting from the copolymerization of GMA with phthalic anhydride, onto carbon. Nevertheless, mention should be made, in this case, of the presence of COOK groups on the surface of the carbon which would react with the epoxy group of the GMA.

Tsubokawa and H. Ueno (Journal of Applied Polymer Science, 1995, Vol. 58, 1221–1227) follow a similar approach: the polymerization of vinyl monomers is also initiated by the COOK functional groups on the surface of the carbon. In this case there is nothing more than a chemical polymerization, but one which starts from a carboxylate group. It should be pointed out that, in the abovementioned studies, the density of the grafted chains is fixed and limited by the surface density of the functional groups.

These same authors also describe the possibility of grafting, directly on the carbon substrate, preformed polymer chains, (polydimethylsiloxane-azobiscyanopentanoate or polyethylene glycol-azobiscyanopentanoate) carrying a chemical functional group capable of decomposing in order to form a radical ("azopolymers"). This macroradical would react with the aromatic rings available on the surface of the carbon.

6) T. Lipatova, V. Matyushova and J. Donnet (Carbon, 1985, Vol. 23, No. 1. 59–64) also claim the electrochemical grafting of a polymer, such as, for example, poly(2-ethylhexyl acrylate) onto carbon fibres. No control of the current or of the potential is specified. As regards the grafting mechanism, this has not been clearly established and, according to the authors, would involve reactive centres lying in surface microheterogeneities of favourable energy. The grafting would only take place at these heterogeneities and would result in an inhomogeneous surface coating.

One of the essential aims of the present invention is to provide a process making it possible to produce carbon-based composites in which the polymer is fixed directly to the carbon without recourse to any intermediate chemical molecule or element normally used for fixing the polymer to the carbon.

According to the invention, a composite is obtained in which the polymer is fixed, by grafting onto the carbon substrate, by a carbon-carbon chemical bond which forms an integral part of the polymer itself. There is therefore continuity between the carbon and the polymer.

This has proved to allow a composite to be obtained which has very good mechanical and chemical properties compared with the prior art mentioned above.

For this purpose, the process according to the invention is characterized in that use is made of a reaction system comprising (a) at least one monomer able to form a polymer on the abovementioned substrate, (b) an aprotic solvent and (c) an electrolyte giving the organic medium thus obtained an electrical conductivity sufficient to lead to electrolysis therein, in which the carbon substrate forms the cathode, by applying an electric potential or an electric current bringing the reaction system into the passivation region corresponding to a first inhibition peak revealed in voltammetry, so as to form a polymer grafted onto the aforementioned substrate.

Advantageously, use is made of a monomer/solvent pair chosen from the group formed by acrylonitrile/acetonitrile, acrylonitrile/propylene carbonate, acrylonitrile/dimethylformamide, acrylonitride/dimethacrylamide, acrylonitrile/pyridine, ethyl acrylate/dimethylformamide, ethyl acrylate/pyridine, silylated 2-hydroxy-ethyl methacrylate/dimethylformamide, methyl methacrylate/dimethylformamide, glycidyl methacrylate/ dimethylformamide, n-butyl acrylate/dimethylformamide, tert-butyl acrylate/dimethylformamide and allyl methacrylate/dimethylformamide systems.

BRIEF DESCRIPTION OF THE DRAWINGS

Further details and features of the invention will emerge from the description given below by way of example of a few particular embodiments of the invention with reference to the appended drawings in which.

In the various figures, the same reference numbers refer to the same elements.

The invention is aimed at the manufacture of a substantially homogeneous carbon/polymer composite which is characterized by direct and stable fixing of the polymer to the carbon without recourse to any intermediate element or treatment normally used for fixing the polymer to the carbon, as well as at the composites having this particular characteristic.

According to the invention, the carbon-carbon chemical bond, which fixes the polymer to the carbon substrate, forms an integral part of the polymer itself.

The novelty according to the invention may be established as following on the basis of a general example.

A monomer (acrylonitrile) is dissolved in an aprotic solvent (acetonitrile) in the presence of a substrate-electrolyte ($Et_4NClO_4$) giving the organic medium an electrical conductivity sufficient to lead to electrolysis therein.

Figure 4:
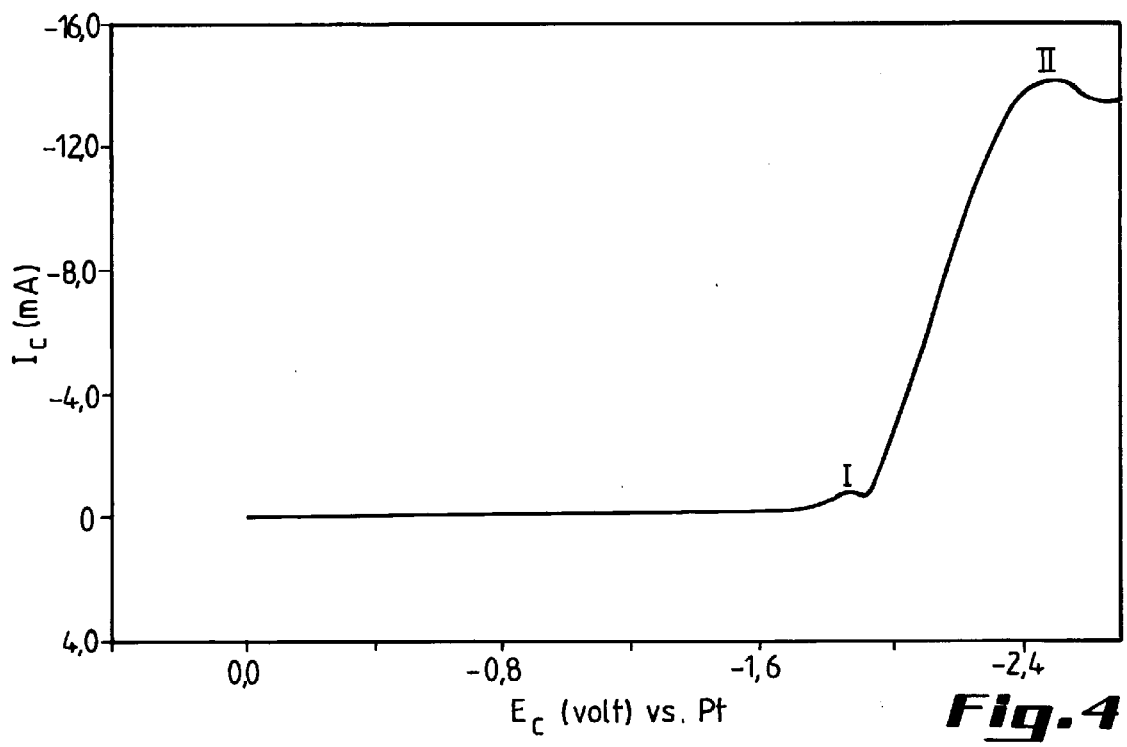
FIG. 4 shows a voltammogram.

The electrochemical reduction of this system is monitored by voltammetry, in which the cathode is a sheet of graphite whose immersed surface has an area of, for example, 1 $cm^2$. In FIG. 4, the potentials are measured with respect to a reference pseudoelectrode consisting of a wound platinum foil having a surface area of approximately 10 $cm^2$.

The grafting and the chemical polymerization of the monomer appear at peak I.

In a first step, the reduction fixes the monomer by grafting at the potential Ep1 of the inhibition peak I to the cathode, while, in a second step, the polymerization (P) of the (co)monomers takes place with the first unit grafted onto the cathode in order to form a (co)polymer on the latter.

It has been found, according to the invention and in an unpredictable way, that, if the applied potential does not go beyond this region, the cathode is covered with a thin film of polyacrylonitrile (PAN) grafted onto the carbon cathode. There is therefore continuity between the carbon and the polymer, as mentioned above.

The grafting is demonstrated irrefutably: the PAN film formed under these conditions is insoluble in dimethylformamide, which is a good solvent for PAN. At the second peak, the PAN film produced in the peak I is degrafted because the electric field becomes too intense, but polymerization of acrylonitrile in solution occurs near the cathode, and a thick film of PAN then precipitates on the graphite since PAN is insoluble in acetonitrile. Near the second peak, the thick film of PAN that was formed is no longer grafted and it is completely soluble in dimethylformamide (DMF).

At the potential Ep2 of the second peak, the reduction of the monomer leads to the formation of a soluble species which then initiates the polymerization of this same monomer in order to form a polymer which will either precipitate on the cathode in a non-solvent medium for the polymer, or which will otherwise remain in solution.

According to the invention, several monomers are capable of being grafted onto the carbon substrate under the conditions of the invention described above.

With regard to the solvent used, this must preferably be such that it allows the monomer to be dissolved in sufficient concentrations, for example above 0.01 mol/litre. There is no upper limit to the concentration of the monomer that can be employed in the pure state, that is to say without a solvent.

It has been found that very good results are obtained by choosing the following monomer/solvent pairs: acrylonitrile/acetonitrile, acrylonitrile/propylene carbonate, acrylonitrile/dimethylformamide, acrylonitrile/dimethylacetamide, acrylonitrile/pyridine, ethyl acrylate/dimethylformamide, ethyl acrylate/pyridine, silylated 2-hydroxyethyl methacrylate/dimethylformamide, methyl methacrylate/dimethylformamide, glycidyl methacrylate/dimethylformamide, n-butyl acrylate/dimethylformamide, tert-butyl acrylate/dimethylformamide and allyl methacrylate/dimethylformamide.

All the solvents used belong to the class of aprotic solvents in which the grafting may be carried out under industrially acceptable conditions.

Moreover, the choice of electrolyte-substrate has hardly any fundamental influence.

In order to be able to carry out the electrolysis in the region of the inhibition peak I, as indicated above, and thus obtain a homogeneous grafting of the polymer onto the carbon, two techniques may in principle be applied. These are potentiostatic electrolysis, in which the potential of the cathode is fixed with respect to a reference electrode in the region of peak I, and galvanostatic electrolysis, in which the polymerization current is fixed at a value below the maximum current (ip) defined in voltammetry. In the latter case, the duration of the DC pulse must preferably be less than the duration of the polymerization at the first peak, so as not to invoke the second polymerization mechanism (peak II).

Figure 1:
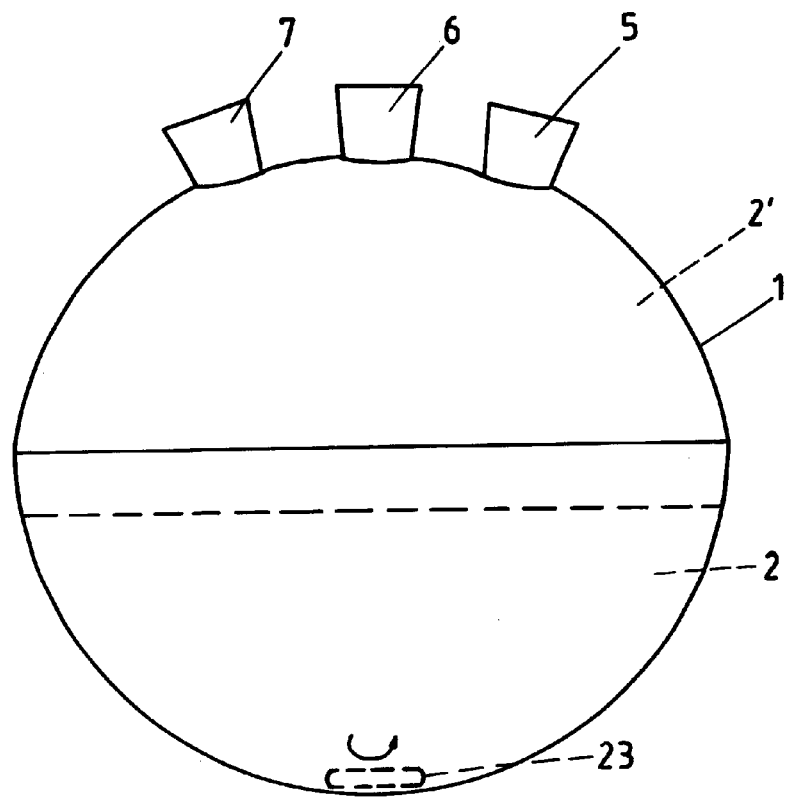
FIG. 1 is a schematic side view of an electrochemical cell allowing the process according to the invention to be implemented, in which the electrodes have been omitted.
Figure 2:
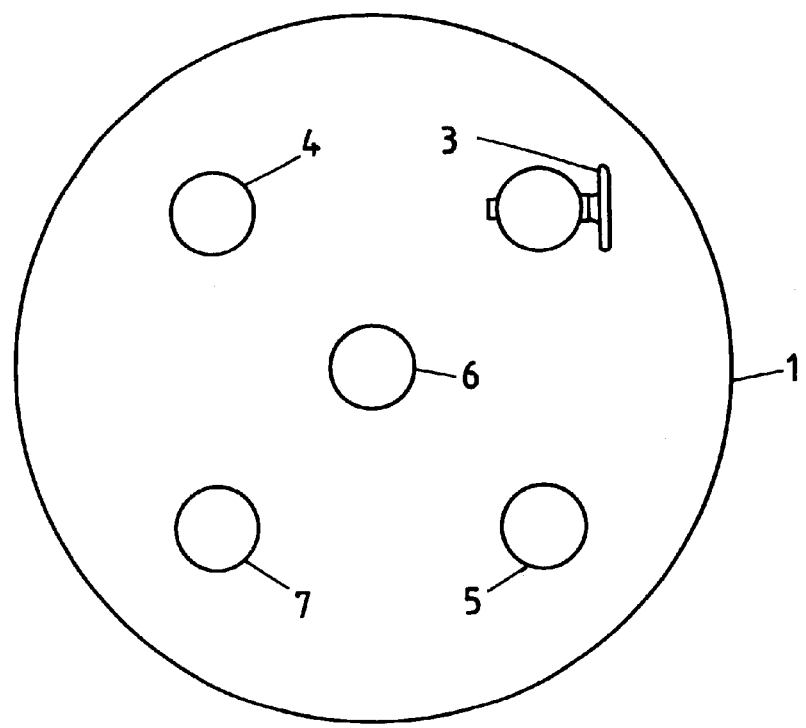
FIG. 2 is a view from above this same cell.
Figure 3:
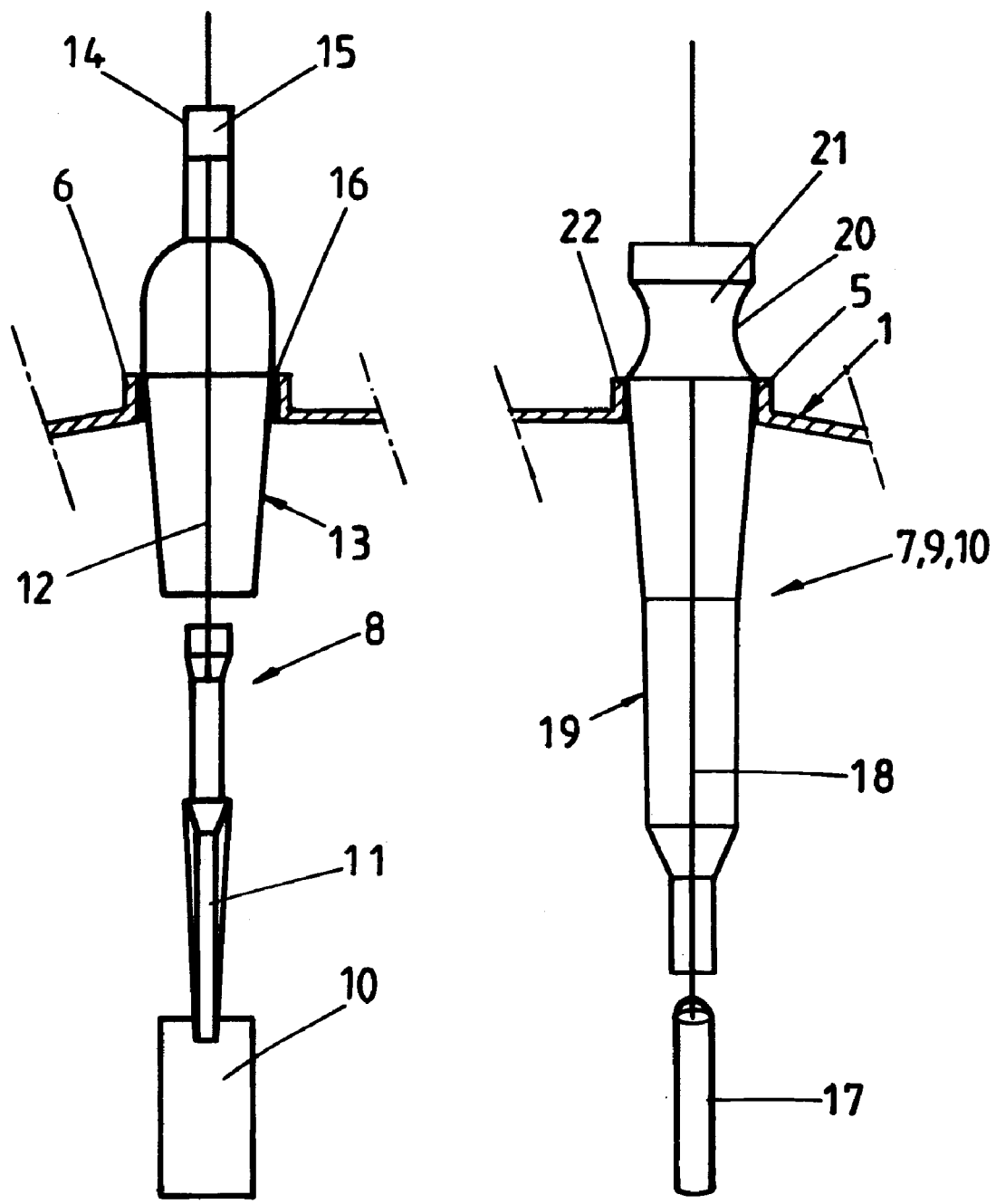
FIG. 3 is a partial vertical section, on a larger scale, of two electrodes mounted in the cell shown in the previous figures.

The electrolysis cell, as illustrated in FIGS. 1 to 3 and which can be used for implementing the process according to the invention, comprises a closed chamber 1 containing a solution 2 formed from a solvent, a monomer and an electrolyte. A bar magnet 23 rotating about a vertical spindle is provided in the bottom of this chamber 1, in order to ensure that the solution 2 is homogeneous.

The upper part of this chamber 1 has a tap 3 making it possible to maintain, above the solution 2, an inert atmosphere of nitrogen 2', the oxygen and water content of which does not exceed 10 ppm, and four internally ground conical housings 4, 5, 6 and 7 from which electrodes are suspended, especially a central working electrode 8, two counterelectrodes 9 and 10 lying on either side of the working electrode 8, and a reference electrode 11.

These electrodes are shown in greater detail in FIG. 3. At its lower free end, the working electrode 8 comprises a glassy carbon plate 24 (not shown) to be covered, having, for example, a width of 1 cm, a height of 2 cm and a thickness of 2 mm. This plate 24 is suspended by a clamp 25 (not shown) to a conductor 12 which extends inside, along the axis of, a glass sleeve 13, the upper opening 14 of which is closed by an epoxy adhesive stopper 15. The sleeve 13 has a ground conical outer wall 16 which fits in a substantially sealed manner in the housing 6 in the chamber 1.

The reference electrode 11 and the counterelectrodes 9 and 10 have the same construction and comprise a platinum foil wound in the form of a cylinder 17 having an area of about 10 cm². This cylinder 17 is suspended from a conductor 18 which extends along the axis of a glass sleeve 19 closed at its upper end 20 by an epoxy adhesive plug 21.

As in the case of the electrode 8, the electrodes 11, 9 and 10 have a conical outer wall 22 which fits in a substantially sealed manner into the corresponding housings 7, 4 and 5 in the chamber 1.

In a variant, the working electrode 8 may be formed by a bar of glassy carbon, for example 2 mm in diameter and 2 cm in length, or else by carbon fibres, for example of the AS-4 type.

The working electrodes 8 are preferably degreased and rinsed using various non-polar solvents, such as heptane, or polar solvents, such as acetone, and then dried for several hours in vacuo at 40° C.

The specific examples given below, which apply to an electrolysis cell of the type shown in FIGS. 1 to 3 and described above, allow the process according to the invention to be illustrated further.

EXAMPLES

Example 1

Glassy Carbon Plate/acrylonitrile (AN)/acetonitrile (ACN)

In this example, the grafting and electro-polymerization of acrylonitrile on a glassy carbon plate, used as the cathode, is carried out in a non-solvent for polyacrylonitrile (PAN), namely acetonitrile. The electrochemical technique consists of electrolysis at a constant potential.

The electrolysis bath was prepared on the basis of the following constituents:

150 ml of ACN (Acros, PA): dried over calcium hydride (CaH$_2$) for 48 hours and then distilled under reduced pressure;

1.9 g of Et$_4$NClO$_4$ (Fluka, >99%): dried in vacuo (p=10$^{-2}$ mbar) at 80° C. for 24 hours;

23 ml of AN (Aldrich, 99%): dried over CaH$_2$ for 48 hours and then distilled under reduced pressure.

A constant potential of −1.8 V, corresponding to the potential of the 1$^{st}$ peak (grafting potential in the voltammograms), with respect to a platinum pseudoreference immersed in the electrolysis bath is applied to the working electrode—a glassy carbon electrode—for 10 seconds. The carbon electrode is coated with a thin film of PAN. The latter is fixed to the carbon cathode to the point of not dissolving in DMF, which is a good solvent for PAN.

Example 2

Glassy Carbon Bar/ethyl acrylate (AE)/N,N-dimethylformamide (DMF)

In this example, the grafting of AE onto a glassy carbon bar, used as the cathode, is carried out in a solvent for the polymer, namely polyethyl acrylate (PAE). The electrochemical technique chosen is cyclic voltammetry.

The electrolysis bath was prepared on the basis of the following constituents:

150 ml of DMF (Acros, PA): dried over P$_2$O$_5$ for 72 hours and then distilled under reduced pressure;

1.9 g of Et$_4$NClO$_4$ (Fluka, >99%): dried in vacuo (p=10$^{-2}$ mbar) at 80° C. for 24 hours;

30 ml of AE (Acros, >99.5%): dried over CaH$_2$ for 24 hours and then distilled under reduced pressure.

The electroreduction and polymerization of AE, giving rise to the formation of grafted PAE, is carried out at −1.7 V with respect to a platinum pseudoreference immersed in the electrolysis bath. The PAE film is grafted by applying this potential of −1.7 V to the cathode for 15 seconds. The formation of an insulating film on the carbon in a solvent for the polymer is demonstrated by carrying out a second cathode potential scan on the coated electrode: the current is virtually zero at −1.7 V.

Figure 5:
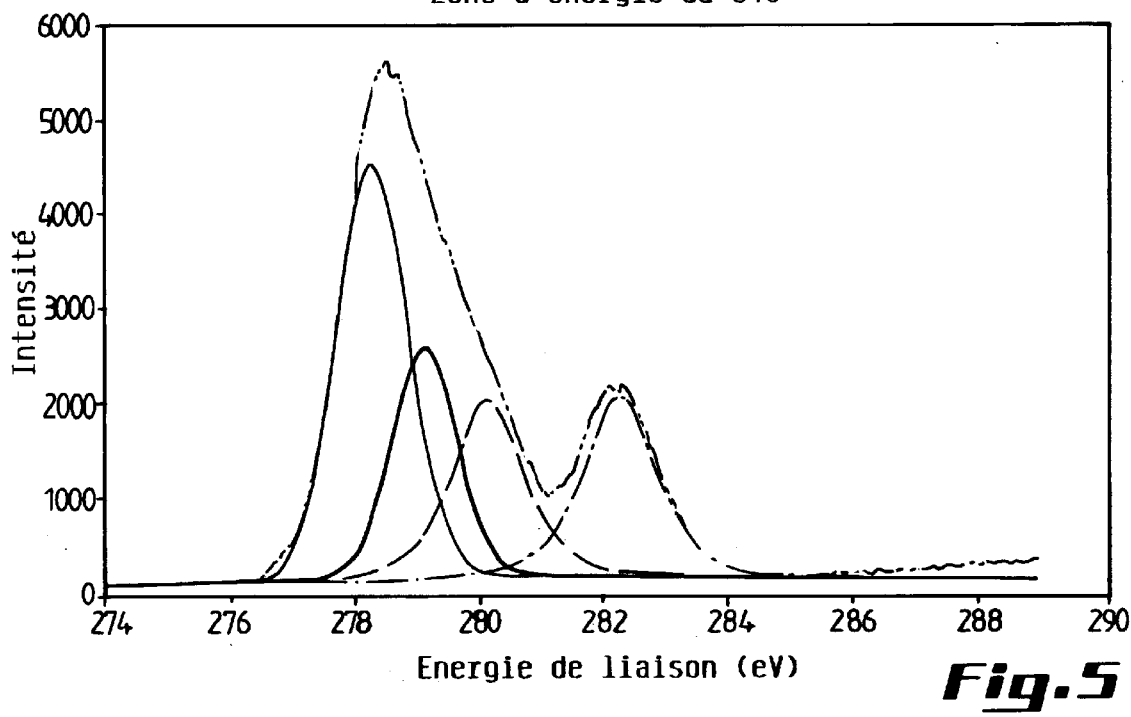
FIG. 5 shows an XPS spectrum of polyethyl acrylate (PAE) in the carbon bond energy region.
Figure 6:
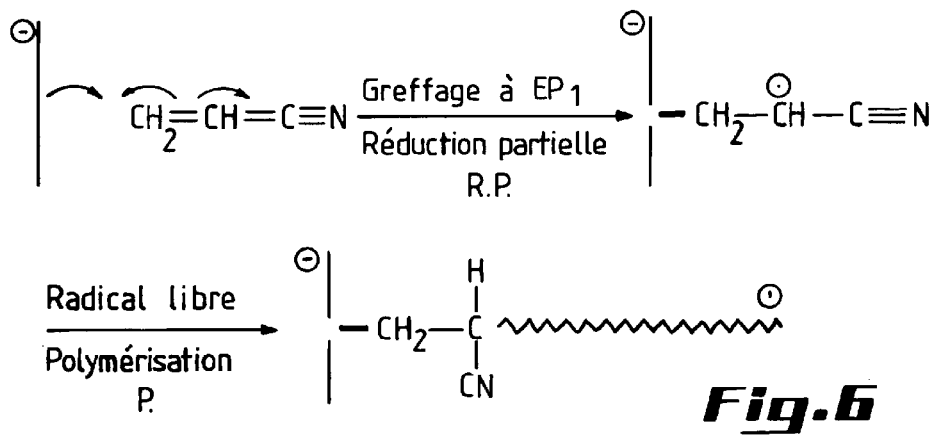
FIG. 6 is a diagram which shows one possible mechanism for the grafting and the polymerization in one particular case according to the invention.

The formation of a film of polyethyl acrylate (PAE) on the carbon electrode is confirmed by XPS. FIG. 5 shows the XPS spectrum of PAE in the 1s carbon bond energy region, obtained by the electrochemical technique described above. This spectrum is in good agreement with the spectrum found in the literature.

Example 3

Graphite Carbon Fibres/silylated hydroxyethyl methacrylate (silylated HEMA)/DMF

In this example, the silylated HEMA is grafted onto graphite carbon fibres used as the cathode. A roving of fibres (2 to 3 cm), gripped by a clamp, is immersed in the electrolysis solution. The electrochemical technique chosen is cyclic voltammetry.

The electrolysis bath was prepared on the basis of the following constituents:

150 ml of DMF (Acros, PA): dried over P$_2$O$_5$ for 72 hours and then distilled under reduced pressure;

1.9 g of Et$_4$NClO$_4$ (Fluka, >99%): dried in vacuo (p=10$^{-2}$ mbar) at 80° C. for 24 hours;

42 ml of silylated HEMA (synthetic product), distilled under reduced pressure.

Figure 7:
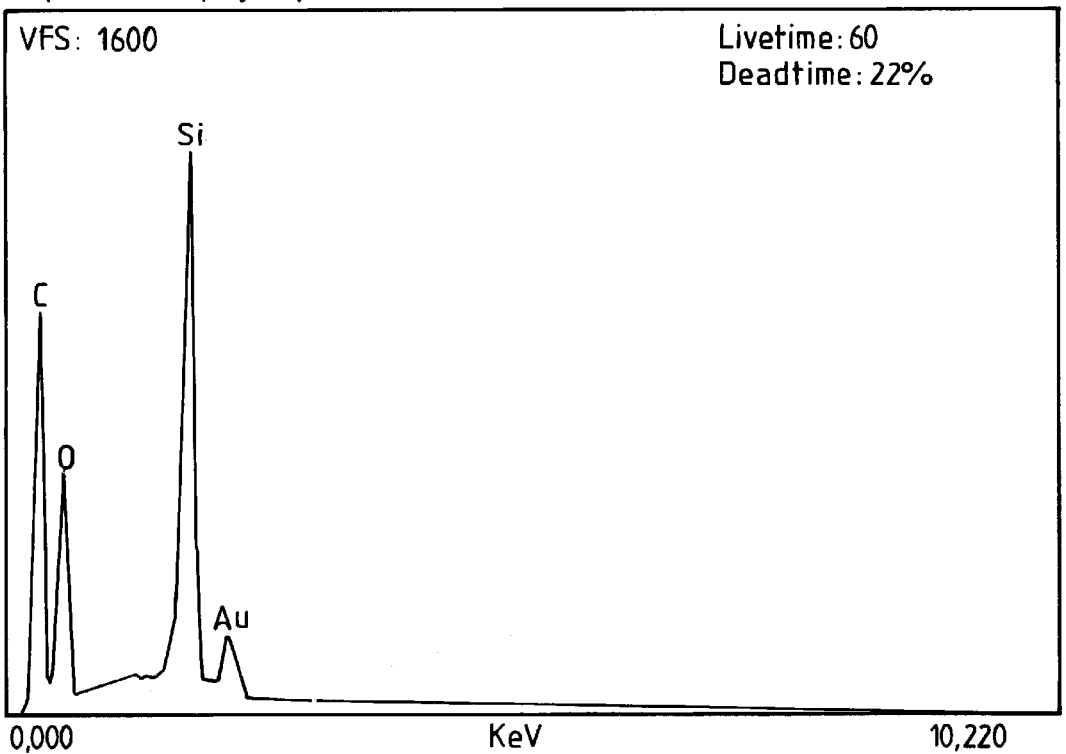
FIG. 7 shows the EDAX spectrum of silylated poly(2-hydroxyethyl methacrylate) (PHEMA) grafted onto carbon fibres.

The electroreduction of the monomer, giving rise to the formation of the grafted polymer, is carried out at −2 V with respect to a platinum pseudo-reference in the electrolysis bath. The grafting of the film of silylated PHEMA is carried out by applying this −2 V potential for 60 seconds. The formation of a film on the fibres in a solvent medium for the polymer is taken as a first proof of the strong interaction between the polymer and the carbon. Prolonged rinsing of the fibres in a solvent for the polymer (DMF) is not sufficient to destroy the bond between the cathode and the polymer. EDAX analysis confirms the presence of silicon on the washed fibres (FIG. 7).

Example 4

Carbon Black Dispersed in High-density polyethylene (HDPE)/acrylonitrile (AN)/DMF In this example, AN is grafted onto carbon black. So as to ensure electrical contact with this powder, and therefore to polarize the carbon and allow grafting, the carbon black is dispersed in an electrochemically inert matrix, namely (HDPE). The plate-shaped composite (of variable thickness and area) is gripped by a crocodile clip in the electrolysis bath and constitutes the cathode. The carbon black content in the HDPE is 30% by weight. The electrochemical technique chosen is chronoammetry.

The electrolysis bath was prepared on the basis of the following constituents:

150 ml of DMF (Acros, PA), dried over $P_2O_5$ for 72 hours and then distilled under reduced pressure;

1.9 g of $Et_4NClO_4$ (Fluka, >99%), dried in vacuo ($10^{-2}$ mbar) at 80° C. for 24 hours;

11 ml of AN (Aldrich, 99%) dried over $CaH_2$ for 48 hours and then distilled under reduced pressure.

A constant potential of −2.2 V, corresponding to the potential of the $1^{st}$ peak (grafting potential in the voltammograms) with respect to a platinum pseudoreference is applied to the working electrode (carbon black/HDPE) for 15 seconds. The formation of an insulating film is confirmed by cyclic voltammetry: this is because the electrode no longer conducts a current in the grafting potential range. The strong adhesion of the film is proved by repeated washing in DMF, a solvent for the polymer.

The formation of a film of polyacrylonitrile (PAN) on the glassy carbon electrode is confirmed by XPS.

Of course, the invention is not limited to the embodiments described above and many other variants may be envisaged without departing from the scope of the invention, especially with regard to the electrolysis cell used for carrying out the process. Thus, if the carbon substrate is formed by yarns or sheets, it is possible to apply the process continuously, by making the carbon substrate run through the electrolysis bath over a drum to which a negative potential has been applied.

We claim:

1. A process for coating by electrochemically grafting a carbon based substrate with a polymer or copolymer, wherein use is made of an electrically conductive mixture comprising:
   a. at least one monomer able to form a polymer on said substrate;
   b. an aprotic solvent; and
   c. an electrolyte for increasing said electrical conductivity of said mixture, said mixture being subjected to electrolysis so as to create a cathode reaction wherein said carbon based substrate is used as a cathode to which a voltage is applied having a voltage value situated within an electrical potential range corresponding to a first inhibition peak so as to obtain in a first reaction step a first monomers' grafting on said carbon based substrate and in a second reaction step a polymerization of further monomers with the first monomers grafted on said cathode.

2. A process for coating by electrochemically grafting a carbon based substrate with a polymer or copolymer, wherein use is made of an electrically conductive mixture comprising:
   a. at least one monomer able to form a polymer on said substrate;
   b. an aprotic solvent; and
   c. an electrolyte for increasing said the electrical conductivity of said mixture, said mixture being subjected to electrolysis so as to create a cathode reaction wherein said carbon based substrate is used as a cathode to which a current is applied having a current value situated within an electrical current intensity range corresponding to a first inhibition peak so as to obtain in a first reaction step a first monomers' grafting on said carbon based substrate and in a second reaction step a polymerization of further monomers with the first monomers grafted on said cathode.

3. A process according to claim 1, wherein said aprotic solvent is selected to enable a formation of a solution of said monomers.

4. A process according to any one of claims 1 or 3, wherein a potential is applied to the cathode, said potential being fixed with respect to a reference electrode in a region around said first inhibition peak to maintain said electrolysis for grafting said first monomers on said cathode.

5. A process according to either claim 1 or 2, wherein use is made of a pair of monomer and aprotic solvent selected from the group consisting of acrylonitrile/acetonitrile, acrylonitrile/propylene carbonate, acrylonitrile/dimethylformamide, acrylonitrile/dimethylacrylamide, acrylonitrile/pyridine, ethyl acrylate/dimethylformamide, ethyl acrylate/pyridine, silylated 2-hydroxyethyl methacrylate/dimethylformamide, methyl methacrylate/dimethylformamide, glycidyl methacrylate/dimethylformamide, n-butyl acrylate/dimethylformamide, tert-butyl acrylate/dimethylformamide and allyl methacrylate/dimethylformamide systems.

6. A process according to any one of claims 1 or 2 wherein said carbon-based substrate comprises graphite.

7. A process according to any one of claims or 1 or 2, wherein said carbon-based substrate comprises glassy carbon.

8. A process according to any one of claims 1 or 2, wherein said carbon-based substrate is selected from a group consisting of carbon black or graphite powder dispersed in an electrochemically inert matrix, or a mixture thereof agglomerated by an organic binder to obtain a sufficient electrical conductivity.

9. A process according to any one of claims 1 or 2, wherein said carbon-based substrate has a shape selected from a group consisting of a fibre, a yarn, a sheet and a plate.

10. A process according to either claim 1 or 2, wherein said aprotic solvent is selected to enable a formation of a solution of said monomers and to maintain said electrolysis for grafting said first monomers on said cathode, a potential applied to the cathode is fixed with respect to a reference electrode in a region around said first inhibition peak.

11. A process according to claim 1, wherein said aprotic solvent is selected to enable a formation of a solution of said monomers and a current applied to said cathode is in the form of DC pulses.

12. A process according to either claim 1 or 2, further comprising a pair of monomer and aprotic solvent selected from group consisting of acrylonitrile/acetonitrile, acrylonitrile/propylene carbonate, acrylonitrile/dimethylformamide, acrylonitrile/dimethylacrylamide, acrylonitrile/pyridine, ethyl acrylate/dimethylformamide, ethyl acrylate/pyridine, silylated 2-hydroxyethyl methacrylate/dimethylformamide, methyl methacrylate/dimethylformamide, glycidyl methacrylate/dimethylformamide, n-butyl acrylate/dimethylformamide, tert-butyl acrylate/dimethylformamide and allyl methacrylate/dimethylformamide systems and in order to maintain said electrolysis for grafting said first monomers on said cathode, a potential being applied to the cathode, said potential being fixed with respect to a reference electrode and being in a region around said first inhibition peak.

13. A process according to claim 1, wherein use is made of a pair of monomer and aprotic solvent selected from the group consisting of acrylonitrile/acetonitrile, acrylonitrile/ propylene carbonate, acrylonitrile/dimethylformamide, acrylonitrile/dimethylacrylamide, acrylonitrile/pyridine, ethyl acrylate/dimethylformamide, ethyl acrylate/pyridine, silylated 2-hydroxyethyl methacrylate/dimethylformamide, methyl methacrylate/dimethylformamide, glycidyl methacrylate/dimethylformamide, n-butyl acrylate/dimethylformamide, tert-butyl acrylate/dimethylformamide and allyl methacrylate/dimethylformamide systems and wherein a current is applied to said cathode as DC pulses.

14. A process according to claim 2, wherein said aprotic solvent is selected to enable a formation of a solution of said monomers.

15. A process according to any one of claims 2 or 14, wherein said current is responsive to DC pulses applied to said cathode.

16. A process according to claim 2, wherein said aprotic solvent is selected to enable formation of a solution of said monomers and said current applied to said cathode is in the form of DC pulses.

17. A process according to claim 2, wherein use is made of a pair of monomer and aprotic solvent selected from the group consisting of acrylonitrile/acetonitrile, acrylonitrile/propylene carbonate, acrylonitrile/dimethylformamide, acrylonitrile/dimethylacrylamide, acrylonitrile/pyridine, ethyl acrylate/dimethylformamide, ethyl acrylate/pyridine, silylated 2-hydroxyethyl methacrylate/dimethylformamide, methyl methacrylate/dimethylformamide, glycidyl methacrylate/dimethylformamide, n-butyl acrylate/dimethylformamide, tert-butyl acrylate/dimethylformamide and allyl methacrylate/dimethylformamide systems and wherein said current is applied to said cathode as DC pulses.

* * * * *